United States Patent
Deurloo et al.

(10) Patent No.: US 7,019,468 B2
(45) Date of Patent: Mar. 28, 2006

(54) ELECTRONIC BALLAST WITH IGNITION AND OPERATION CONTROL

(75) Inventors: Oscar J. Deurloo, Rosmalen (NL); Jonathan Hollander, Hod-Hasharon (IL); Dimitry Orlov, Netanya (IL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/499,161

(22) PCT Filed: Dec. 19, 2002

(86) PCT No.: PCT/US02/40919

§ 371 (c)(1),
(2), (4) Date: Jun. 16, 2004

(87) PCT Pub. No.: WO03/060619

PCT Pub. Date: Jul. 24, 2003

(65) Prior Publication Data

US 2004/0257004 A1    Dec. 23, 2004

Related U.S. Application Data

(60) Provisional application No. 60/342,951, filed on Dec. 21, 2001.

(51) Int. Cl.
*G05F 1/00* (2006.01)
(52) U.S. Cl. .................. 315/291; 315/307; 315/224
(58) Field of Classification Search ............ 315/291, 315/307, 224, 225, DIG. 4
See application file for complete search history.

(56) References Cited

U.S. PATENT DOCUMENTS

| | | | |
|---|---|---|---|
| 4,928,038 A | 5/1990 | Nerone | 315/209 |
| 5,233,273 A * | 8/1993 | Waki et al. | 315/224 |
| 5,235,255 A | 8/1993 | Blom | 315/224 |
| 5,363,020 A | 11/1994 | Chen et al. | 315/307 |
| 5,583,402 A | 12/1996 | Moisin et al. | 315/307 |
| 5,796,216 A | 8/1998 | Beasley | 315/276 |
| 5,914,571 A | 6/1999 | Beasley | 315/244 |
| 6,002,214 A * | 12/1999 | Ribarich | 315/307 |
| 6,031,342 A | 2/2000 | Ribarich et al. | 315/291 |
| 6,369,522 B1 | 4/2002 | Collins | 315/291 |

* cited by examiner

Primary Examiner—Tuyet Thi Vo

(57) ABSTRACT

The present invention provides a high frequency electronic ballast with ignition and operation control, and method of use, comprising a ballast microcontroller (200) responsive to at least one high intensity discharge (HID) lamp feedback signal and generating an HID lamp control signal; a parallel capacitive circuit (214) operably connected parallel to the HID lamp (216); an inductive circuit (212) operably connected to the parallel capacitive circuit (214); means for switching power (252) to the inductive circuit (212) in response to the HID lamp control signal; and means for monitoring the HID lamp (216) to generate at least one high intensity discharge (HID) lamp feedback signal. In one embodiment, the HID lamp feedback signal can be an ignition voltage signal (266). In another embodiment, the HID lamp feedback signal can be a sensed rail voltage signal (256), a sensed lamp current signal (264), and a sensed lamp power signal (258).

32 Claims, 14 Drawing Sheets

ELECTRONIC BALLAST WITH IGNITION AND OPERATION CONTROL

This application claims priority from International application No. PCT/US02/40919 filed on Dec. 19, 2002 and incorporates herein by reference U.S. Provisional Application No. 60/342,951, entitled High Frequency Ballast, filed Dec. 21, 2001.

The technical field of this disclosure is high frequency ballast systems, particularly, a high frequency electronic ballast with ignition and operation control.

High Intensity Discharge (HID) lamps, such as mercury vapor, metal halide, high-pressure sodium, and low-pressure sodium, are used for a variety of lighting tasks. HID lamps are efficient, providing a high light output for a given amount of electricity. However, the ignition and operation characteristics of HID lamps present difficulties in ballast design. Contemporary ballasts present issues of efficiency, complexity, and cost.

HID lamps change from an open circuit when off to a very low impedance once ignited. A high ignition voltage is required to ignite an HID lamp, but a high ignition voltage increases ballast stresses, reducing ballast life.

Reigniting the HID lamp presents additional difficulties. Once extinguished, an HID lamp requires cooling before restrike is possible. Otherwise, the ignition circuit cannot restrike the HID lamp at a reasonable ignition voltage. Attempting to speed restrike by increasing ignition voltage to a high value is restricted by voltage limitations of the HID lamps and lamp sockets.

After ignition, ballasts for HID lamps need to operate efficiently. The power in the HID lamp must be held constant to maintain constant lighting as line voltage fluctuates and HID lamps age. Generally, HID lamps use magnetic ballasts, such as reactor, constant wattage autotransformer (CWA), or high reactance ballasts. Power losses limit efficiency. For example, a CWA or a high reactance ballast can lose 45 to 55 Watts of power for a 400 Watt system. More sophisticated operation control systems are more efficient, but require expensive components, limiting their application.

U.S. Pat. No. 4,928,038 to Nerone, entitled Power Control Circuit For Discharge Lamp And Method Of Operating Same, describes circuits and methods for controlling the power supplied to a discharge lamp of the type having a closed inductive loop, wherein the closed inductive loop is operated by an electrical power supply having a d–c input stage and an output power controlled by the switching frequency of a switch means within the power supply itself whereby current flows to the closed inductive loop when the switch means is conductive and no current flows from the power supply to the closed loop when the switch means is non-conductive.

U.S. Pat. No. 5,235,255 to Blom, entitled Switching Circuit For Operating A Discharge Lamp With Constant Power, and assigned to the same assignee as the present invention, describes a circuit arrangement for operating a discharge lamp at a substantially constant power by means of a switch mode power supply having a variable input current and provided with switching means which switch periodically for controlling the input current by means of a drive signal generated in a drive circuit and formed from a signal which is proportional to the input current and a reference signal.

U.S. Pat. No. 5,796,216 to Beasley, entitled Electronic Ignition Enhancing Circuit Having Both Fundamental And Harmonic Resonant Circuits As Well As A DC Offset, describes a high frequency electronic ballast having a transformer in which the transformer has a primary winding which is coupled to a secondary winding via a primary flux path from which flux can be diverted by a secondary flux path including an air gap which can be adjustable.

U.S. Pat. No. 5,914,571 to Beasley, entitled Method for Igniting High Frequency Operated, High Intensity Discharge Lamps, describes a method and circuitry for igniting high frequency operated, high intensity discharge lamps by means of a dual resonant circuit driven by a nonsinusoidal waveform, and includes an alternative embodiment using dc offset circuitry to apply dc voltage to the lamp at typically an integral multiple of the peak value of the alternating applied voltage.

U.S. Pat. No. 6,369,522 to Collins, entitled Metal Halide Lamp Lumen Depreciation Improvement, describes a ballast and metal halide lamp circuit improvement designed to reduce lamp lumen depreciation over the life of the lamp, wherein the circuit comprises a high frequency electronic ballast configured to generate high voltage starting pulses, and a metal halide lamp further comprising an arc tube containing an ionizable medium, and having main electrodes sealed into opposed ends of the arc tube.

It would be desirable to have an electronic ballast with ignition and operation control that would overcome the above disadvantages.

One aspect of the present invention provides an electronic ballast with ignition and operation control.

Another aspect of the present invention provides an electronic ballast with ignition and operation control providing ignition at a lower ignition voltage.

Another aspect of the present invention provides an electronic ballast with ignition and operation control providing earlier hot restrike at a lower ignition voltage.

Another aspect of the present invention provides an electronic ballast with ignition and operation control providing efficient power control.

Another aspect of the present invention provides an electronic ballast with ignition and operation control reducing power losses.

The foregoing and other features and advantages of the invention will become further apparent from the following detailed description of the presently preferred embodiments, read in conjunction with the accompanying drawings. The detailed description and drawings are merely illustrative of the invention, rather than limiting the scope of the invention being defined by the appended claims and equivalents thereof.

Figure 1:
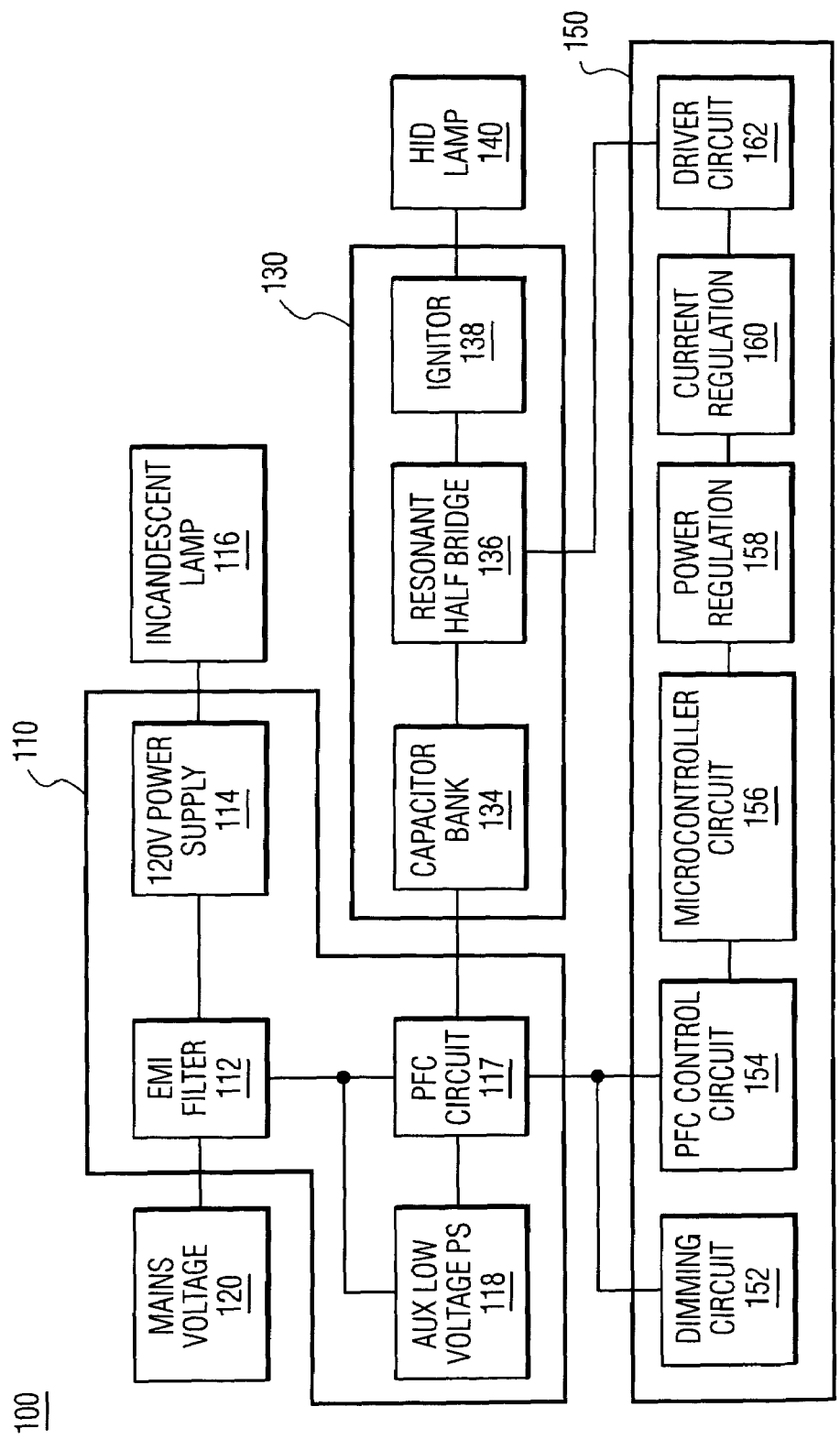
FIG. 1 shows a block diagram of an electronic ballast with ignition and operation control made in accordance with the present invention.

FIG. 1 shows a block diagram of an electronic ballast with ignition and operation control made in accordance with the present invention. Some connections between blocks have been omitted for clarity of illustration. The electronic ballast 100 comprises a power supply 110 fed by mains voltage 120, lamp power circuit 130 supplying high intensity discharge (HID) lamps 140, and ballast control circuit 150. The power supply 110 conditions and adjusts power for the electronic ballast 100, the lamp power circuit 130 delivers power to the HID lamps 140, and the ballast control circuit 150 controls the operation of the electronic ballast 100.

The power supply 110 comprises an electromagnetic interference (EMI) filter 112 on the input of power supply 110, an 120V power supply 114 for powering a back-up incandescent lamp 116, a power factor correction (PFC) circuit 117, and an auxiliary low voltage power supply 118 for powering the ballast control circuit 150. The lamp power circuit 130 comprises a capacitor bank 134, a resonant half bridge 136, and an ignition circuit 138. The ballast control circuit 150 comprises a dimming circuit 152, a power factor correction (PFC) control circuit 154, a microcontroller circuit 156, a power regulation circuit 158, a current regulation circuit 160, and a driver circuit 162.

Figure 2A:
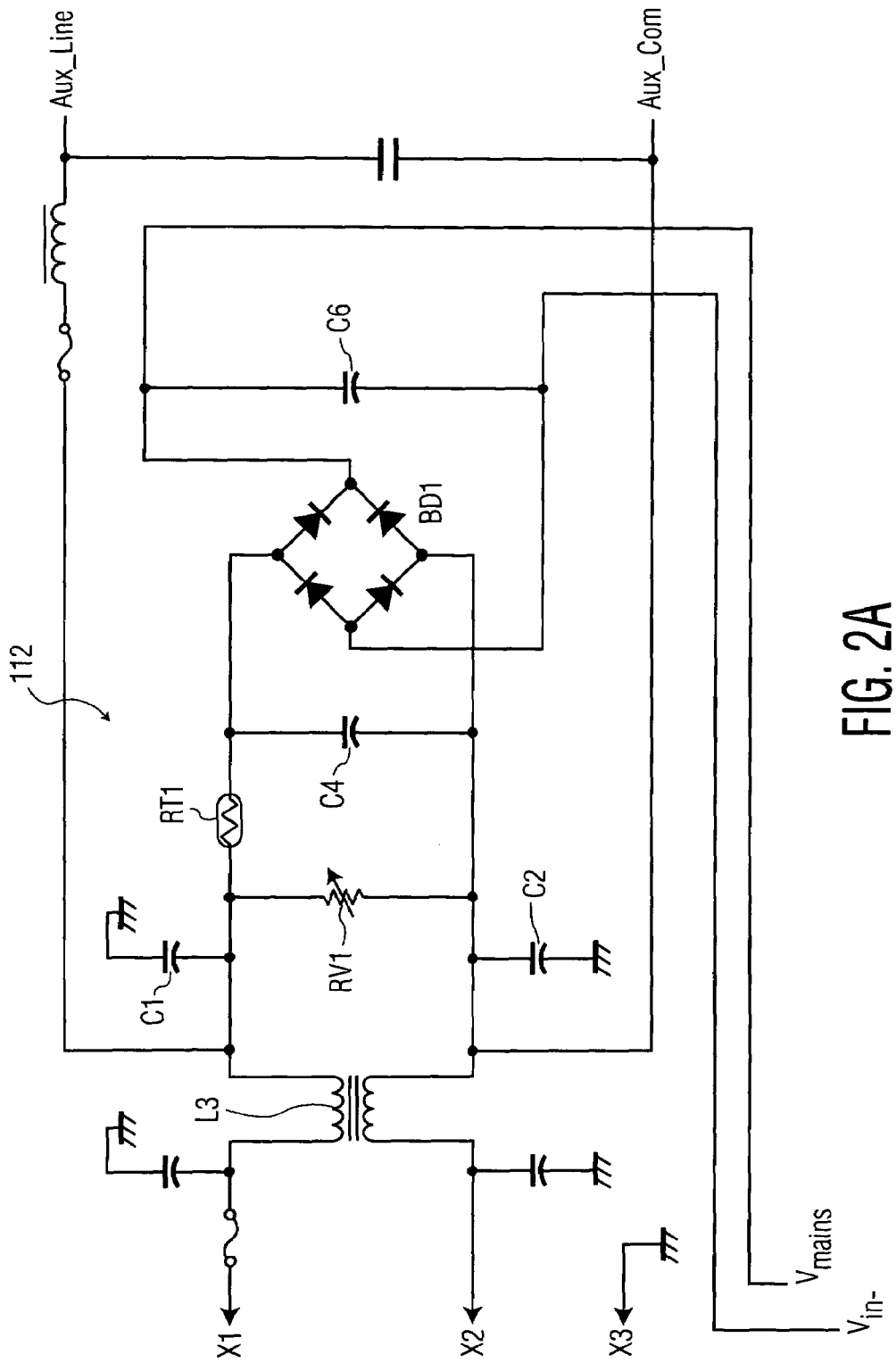
FIGS. 2A–2C show a schematic diagram of a power supply for an electronic ballast with ignition and operation control made in accordance with the present invention.
Figure 2B:
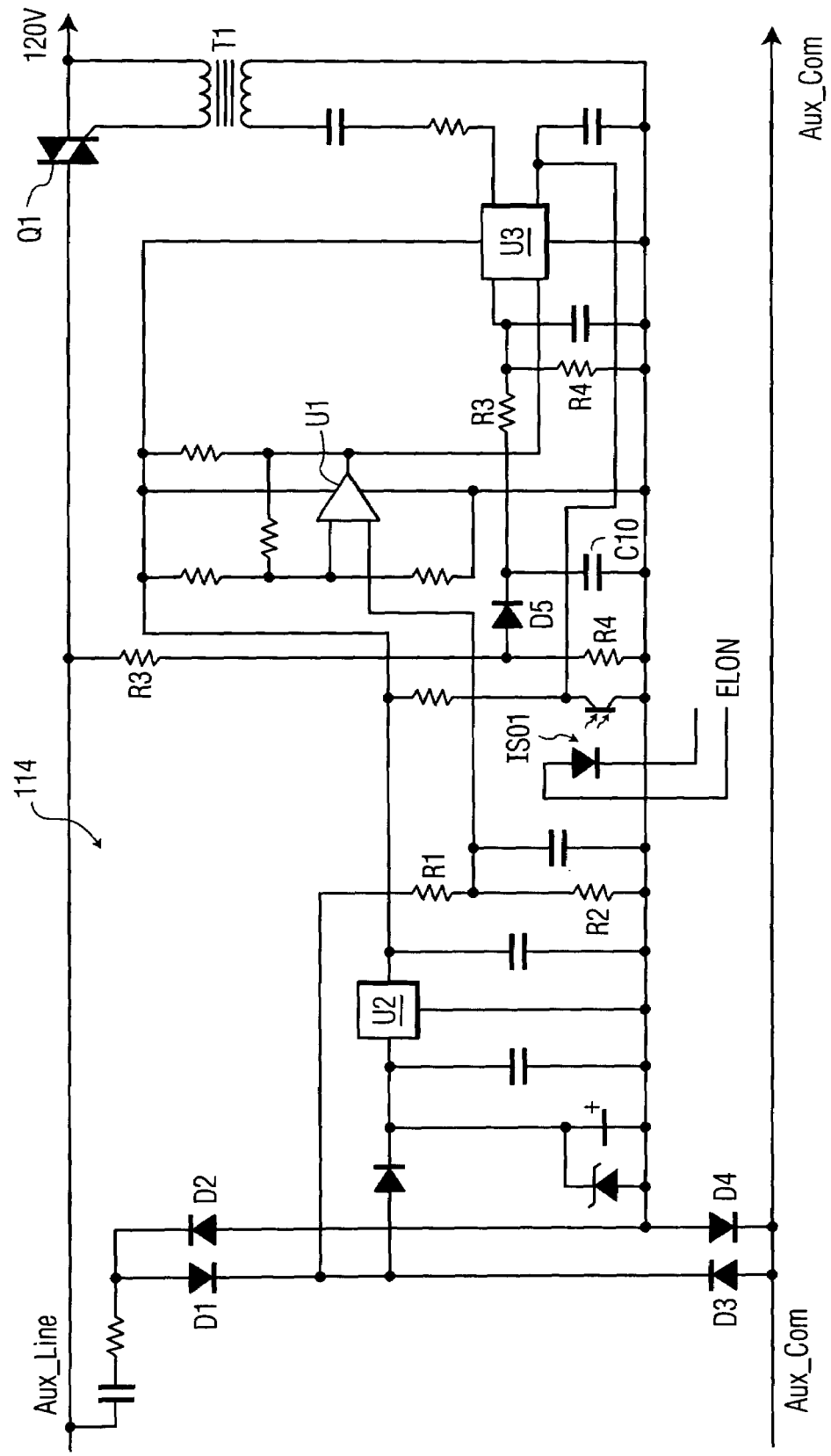
Figure 2C:
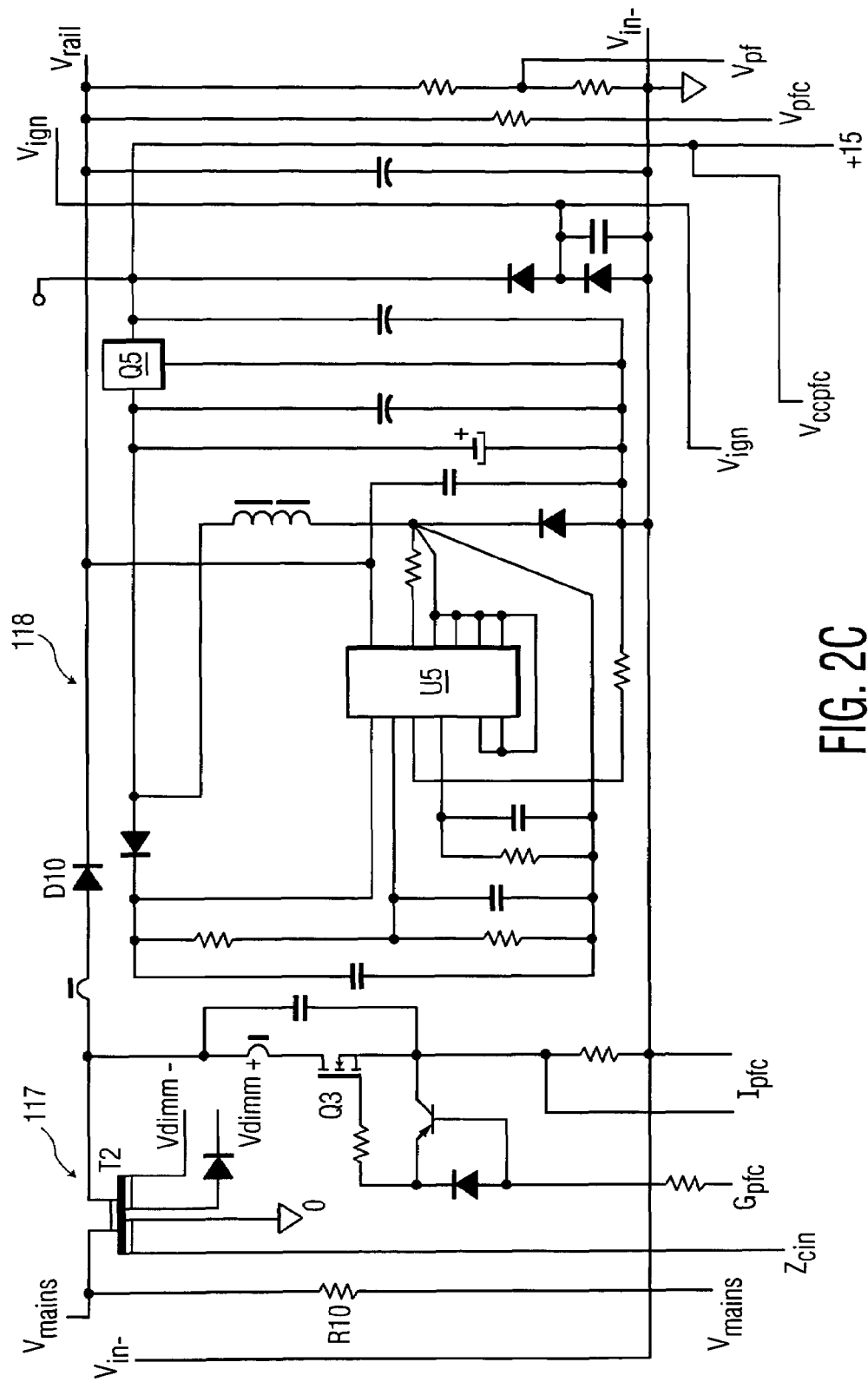

FIGS. 2A–2C show a schematic diagram of a power supply for an electronic ballast with ignition and operation control made in accordance with the present invention. Referring to FIG. 2A, mains voltage is supplied on terminal connections X1, X2, and X3. The mains voltage can vary from about 180V to 305V, and is typically about 200V to 277V. The EMI filter 112 connected to mains voltage comprises transformer L3; capacitors C1, C2, C4, C6; and bridge rectifier BD1. Circuit protection can be provided by inrush current limiter RT1 and voltage suppression varistor RV1. The output of EMI filter 112 continues to the low voltage power supply as the Aux_Line power. An auxiliary line voltage is tapped after transformer L3 to supply the 120V power supply as the mains voltage signal Vmains.

Referring to FIG. 2B, the 120V power supply 114 steps down the 200–277 volt Aux_Line power to 120 volts to provide power to the back-up incandescent lamp. HID lamps have a low light output during warm-up phase, which occurs for about the first minute after power is supplied. HID lamps also need to cool down before they can be reignited, typically for about 5 to 15 minutes. The back-up incandescent lamp supplies lighting when the HID lamp is not burning or burning at a low light level. The back-up incandescent lamp can be a halogen lamp or any other 120V lamp as desired. The 120V power supply 114 is energized anytime the electronic ballast is energized. An ELON signal from the ballast control circuit determines when the 120V power supply 114 supplies power to the back-up incandescent lamp. The ELON signal turns on the light whenever the HID lamp power is less than a predetermined setpoint, such as half nominal HID lamp power, indicating that the HID lamp is not providing substantial light.

The 120V power supply 114 comprises an comparator circuit responsive to an Aux_Line voltage signal and providing a Aux Line zero crossing signal; a 120V microcontroller responsive to the Aux Line zero crossing signal and an Aux Line voltage amplitude signal, and providing a 120V drive signal; and a 120V driver circuit responsive to the 120V drive signal and providing 120V power to the back-up incandescent lamp. The ELON control signal from the ballast control circuit switches the comparator circuit and the 120V microcontroller to turn the 120V power to the back-up incandescent lamp on and off as required.

The full bridge comprising diodes D1, D2, D3, and D4 rectifies the 240–277 volt Aux_Line power. The rectified signal provides an Aux_Line reference signal to comparator U1 after being regulated by voltage regulator U2. The rectified signal also provides a variable Aux_Line voltage signal to the comparator U1 after being scaled by the voltage divider comprising resistors R1 and R2. The comparator U1 compares the Aux_Line reference signal to the Aux_Line voltage signal and provides a Aux Line zero crossing signal to the 120V microcontroller U3. The Aux Line zero crossing signal is used to determine the Aux Line frequency.

The Aux_Line power is scaled by the voltage divider comprising resistors R3 and R4 and provided to the 120V microcontroller U3 as an Aux Line voltage amplitude signal after further conditioning with diode D5, capacitors C10, and resistors R3, R4.

The 120V microcontroller U3 uses the Aux Line zero crossing signal and Aux Line voltage amplitude signal to determine a 120V drive signal for triac Q1. The 120V microcontroller U3 employs a preprogrammed look-up table to look-up the desired timing/phase angle of the triac Q1 based on the Aux Line voltage amplitude signal and corrected for the Aux Line frequency as indicated by the Aux Line zero crossing signal. The 120V drive signal switches the triac Q1 through transformer T1 to provide a well-regulated 120V power to the back-up incandescent lamp. The 120V power supply 114 supplies well regulated 120V power, which will increase the life of the back-up incandescent lamp, and provides over voltage protection to the back-up incandescent lamp.

The ELON control signal from the ballast control circuit switches optical isolator ISO1 to turn the 120V power to the back-up incandescent lamp on and off as required. To turn the 120V power off, optical isolator ISO1 grounds the reference voltage to comparator U1 and the master clear pin on the 120V microcontroller U3.

FIG. 2C shows a schematic diagram of a power factor correction and low voltage power supply for an electronic ballast made in accordance with the present invention. The power factor correction circuit 117 receives the output voltage of the EMI filter and boosts the power supplied to the auxiliary low voltage power supply 118 and the lamp power circuit.

The power factor correction circuit 117 provides a high power factor and low total harmonic distortion. The power factor correction circuit 117 adjusts the rail voltage supplying the lamp power circuit with respect to the mains voltage to reduce the power losses, which would occur by holding a fixed rail voltage independent of the mains voltage. Power factor correction circuit 117 comprises transformer T2, switch Q3, and diode D10. The mains voltage signal Vmains is passed through resistor R10 to provide the mains voltage signal Vmains to the PFC control circuit in the ballast control circuit. The PFC control circuit processes the mains voltage signal Vmains, PFC current signal Ipfc, and PFC voltage signal Vpfc, and returns a PFC gate signal Gpfc to the power factor correction circuit 117. The PFC gate signal Gpfc cycles switch Q3 so that both output voltage requirements and input current requirements are met. In one embodiment, the rail voltage Vrail can be set to discrete values for particular mains voltages. For example, if the mains voltage is below about 210–215 volts, the rail voltage can be set to about 400 volts. Likewise, for mains voltages of about 210 to 255 volts and above about 250 volts, the rail voltage can be set to about 450 volts and about 465–480 volts, respectively. Those skilled in the art will appreciate that different mains voltage ranges and rail voltages can be used as suited for particular applications. Transformer T2 also provides a zero current input signal ZCin to the PFC control circuit to indicate when current in the transformer T2 has reached zero. Transformer T2 also provides power to the dimming circuit in the ballast control circuit through Vdimm+ and Vdimm−. The power factor correction circuit 117 provides voltage signals to the ballast control circuit through the PFC voltage signal Vpfc and the scaled PFC output voltage signal Vpf.

The auxiliary low voltage power supply 118 provides power to the ballast control circuit components. The auxiliary low voltage power supply 118 takes power from the output of the power factor correction circuit 117 and produces lower voltage power at 15 volts using switched mode power supply IC U5. Voltage regulator Q5 regulates the output from the switched mode power supply IC U5. The output of voltage regulator Q5 provides power to the PFC controller through the Vccpfc line and power to the other ballast control circuit components through the +15 line.

Figure 3:
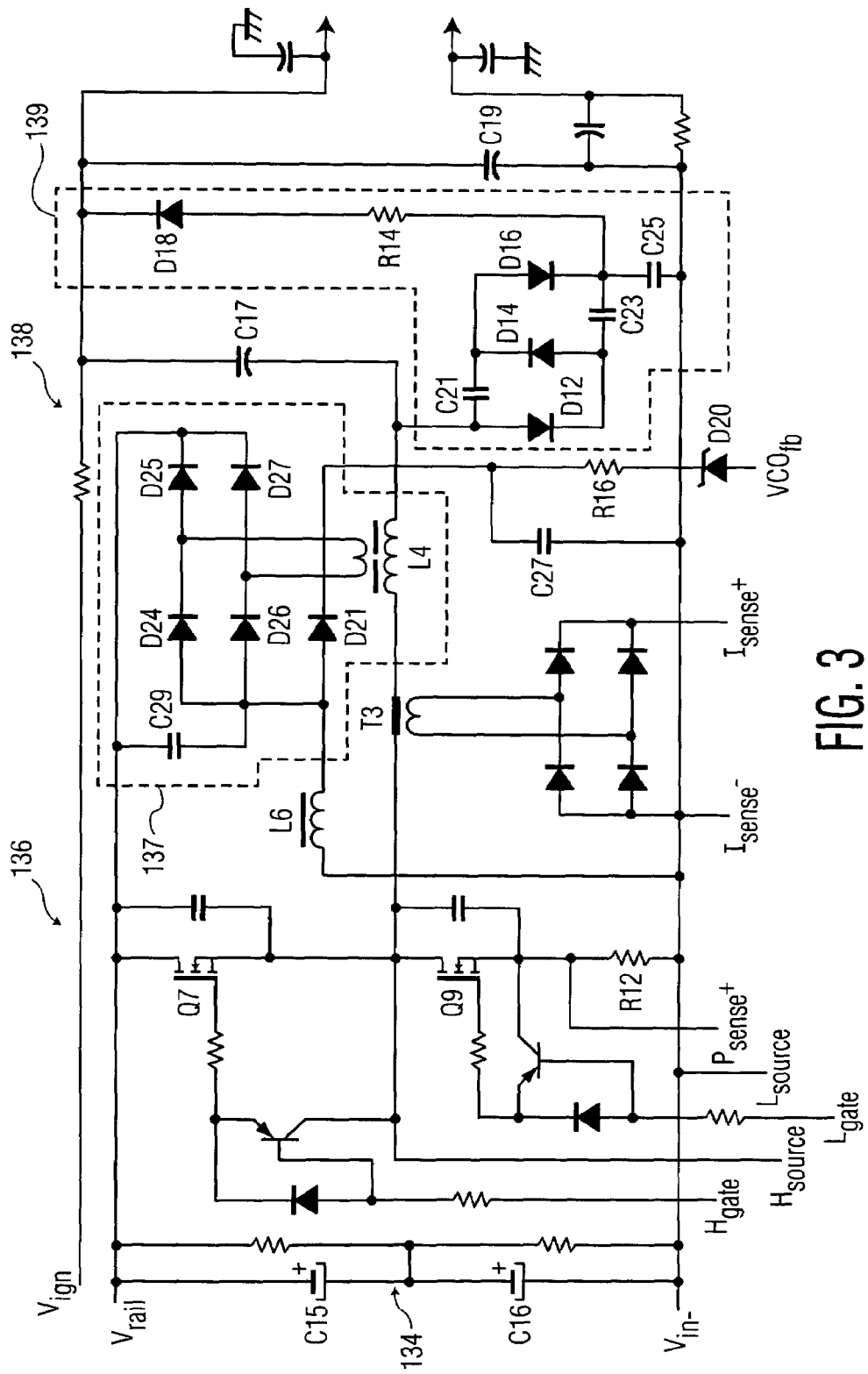
FIG. 3 shows a schematic diagram of a lamp power circuit for an electronic ballast with ignition and operation control made in accordance with the present invention.

FIG. 3 shows a schematic diagram of a lamp power circuit for an electronic ballast with ignition and operation control made in accordance with the present invention. The lamp power circuit 130 comprises capacitor bank 134, resonant half bridge 136, and ignitor 138. Capacitor bank 134 acts as an energy buffer. The resonant half bridge 136 receives power from the EMI filter and converts the power to drive the HID lamp. The ignitor 138 provides a high voltage to the HID lamp during lamp startup.

Capacitor bank 134 on the output of the power factor correction circuit comprises electrolytic capacitors C15 and C16. Resonant half bridge 136 comprises switches Q7, Q9, inductor L4, and capacitor C17. The power to the HID lamp is controlled by the impedance of inductor LA and capacitor C17, and the frequency of the alternate switching of switches Q7 and Q9 in response to high gate signal Hgate and low gate signal Lgate, respectively. High gate signal Hgate and low gate signal Lgate and their respective grounds, HSource and LSource, are supplied by the ballast control circuit.

Signals from the resonant half bridge 136 also provide information to the ballast control circuit. A lamp power signal Psense+ is provided by measuring the voltage across resistor R12 to indicate the power input to the resonant half bridge 136. A sensed lamp current signal Isense+ to Isense− is provided by measuring the current through the transformer T3 which is mounted in series with inductor L4 and capacitor C17. The voltage for the HID lamp can be determined by dividing the lamp power by the lamp current.

Ignitor 138 comprises DC offset circuit 139 operably connected to the connection of inductor L4 and capacitor C17, clamping circuit 137 operably connected to a secondary winding on inductor L4, and capacitor C19. The ignition voltage for the HID lamp is generated by the resonance between the inductor L4 and the capacitor C19, in conjunction with a DC offset voltage applied to capacitor C17 by the DC offset circuit 139. The resonance is a first harmonic resonance.

The DC offset circuit 139 comprises diodes D12, D14, D16, capacitors C21, C23, C25, resistor R14, and diode D18. The DC offset circuit 139 provides a DC offset voltage to capacitor C17 to reduce currents in switches Q7 and Q9 during generation of the ignition voltage. The magnitude of the DC offset voltage is a fixed ratio of the inductor voltage. The DC offset voltage is controlled by the resonant voltage on inductor L4, which is determined by the current through inductor L4. A feedback loop is provided as transformer T3 measures the current through inductor L4 and provides the sensed lamp current signal Isense+ to Isense− to the ballast microcontroller in the ballast control circuit. The ballast control circuit controls the frequency sweep with the Hgate, Lgate, Hsource, and Lsource signals to switches Q7 and Q9.

The DC offset voltage can be set between about 1 kV and 2.5 kV depending on the particular application.

A hardware control/limiting circuit is also provided to control the voltage on inductor L4. The hardware control/limiting circuit comprises coil L6, diode D21, capacitor C27, resistor R16, and zener diode D20. The current through coil L6 generates a voltage that is rectified by diode D21 and filtered by capacitor C27 to produce a voltage controlled oscillator (VCO) feedback signal VCOfb. The VCO feedback signal is provided to the voltage controlled oscillator (VCO) in the ballast control circuit as a feedback control and limit, allowing the ballast control circuit to control the voltage on inductor L4. In one embodiment, the coil L6 is a saturating coil to reduce the effects of switching of the diodes D24, D25, D26, D27.

The clamping circuit 137 comprises a secondary winding of inductor L4, a rectifier bridge of diodes D24, D25, D26, D27, capacitor C29, and diode D21. The clamping circuit 137 conducts if the secondary winding voltage becomes too high, thus limiting the voltage at the inductor L4 to the rail voltage above circuit ground. The winding ratio of the secondary winding of inductor L4 can be used to set the voltage at which the clamping circuit 137 conducts.

In another embodiment, an ignition switch (not shown) responsive to an ignition signal from the ballast control circuit can be provided in series with capacitor C19. The ignition switch can allow the ballast control circuit positive control over the ignition of HID lamp based on the control information provided to the ballast control circuit.

Figure 4A:
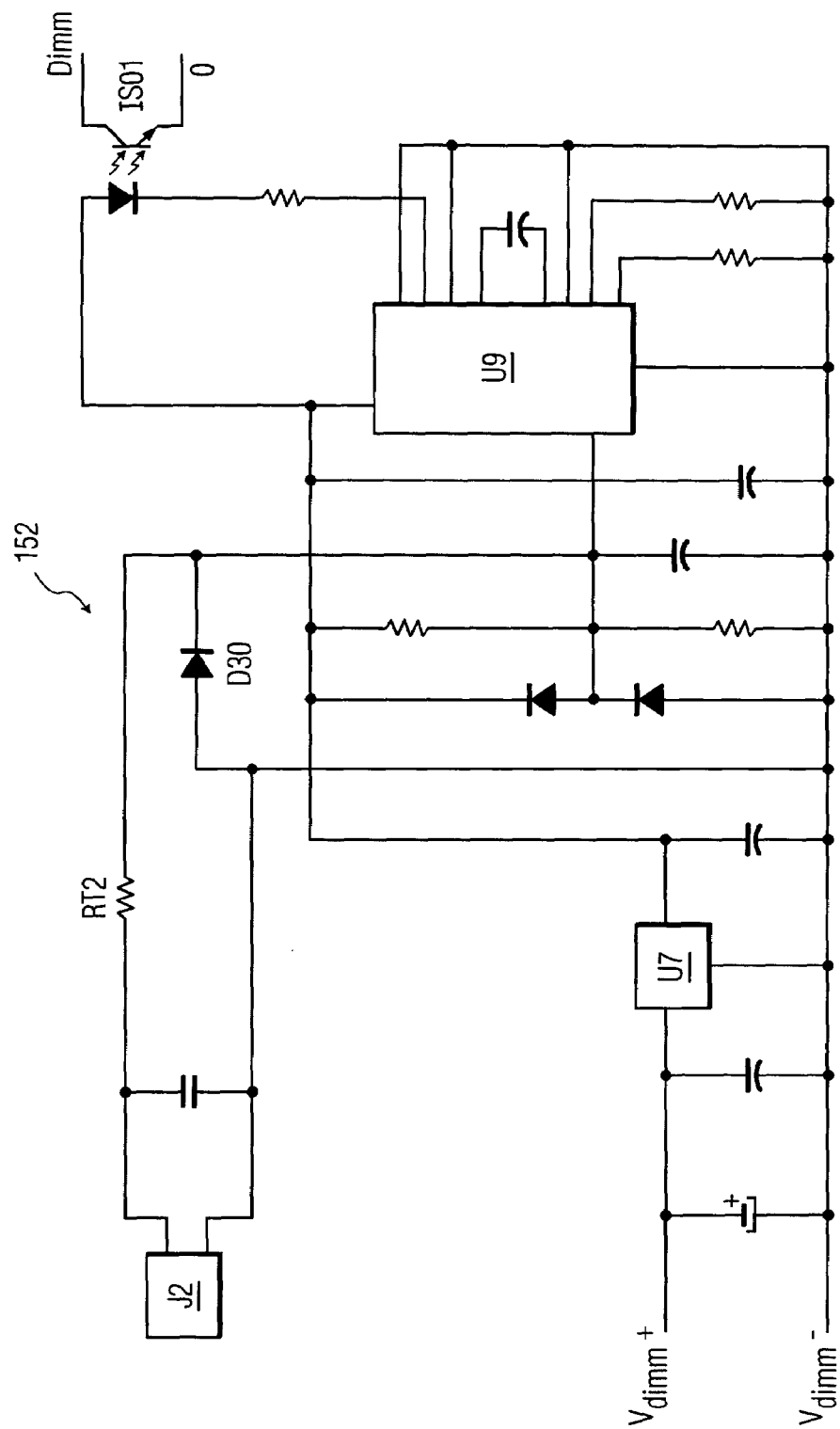
FIGS. 4A–4F show the circuitry of a ballast control circuit for an electronic ballast with ignition and operation control made in accordance with the present invention.

FIGS. 4A–4F show the circuitry of a ballast control circuit for an electronic ballast with ignition and operation control made in accordance with the present invention. FIG. 4A shows a schematic diagram of a dimming circuit for an electronic ballast made in accordance with the present invention. An analog dimming signal is a manually or automatically adjustable input signal received by the dimming circuit 152 at jack J2. The analog dimming signal can be 0–10 volts, or other voltage ranges as required for a particular application. The dimming circuit 152 in the ballast control circuit 150 is protected from high input voltage at jack J2 by positive temperature coefficient (PTC) overcurrent protector RT2 and zener diode D30. The analog dimming signal feeds voltage controlled oscillator U9, which converts the analog dimming signal into a frequency dimming signal Dimm with frequency proportional to the analog dimming signal voltage. The frequency dimming signal Dimm is fed to opto-coupler ISO1, which isolates the dimming circuit 152 output from the microcontroller circuit. The power factor correction circuit provides power to the dimming circuit 152 through Vdimm+ and Vdimm−, with voltage regulator U7 providing voltage stabilization.

Figure 4B:
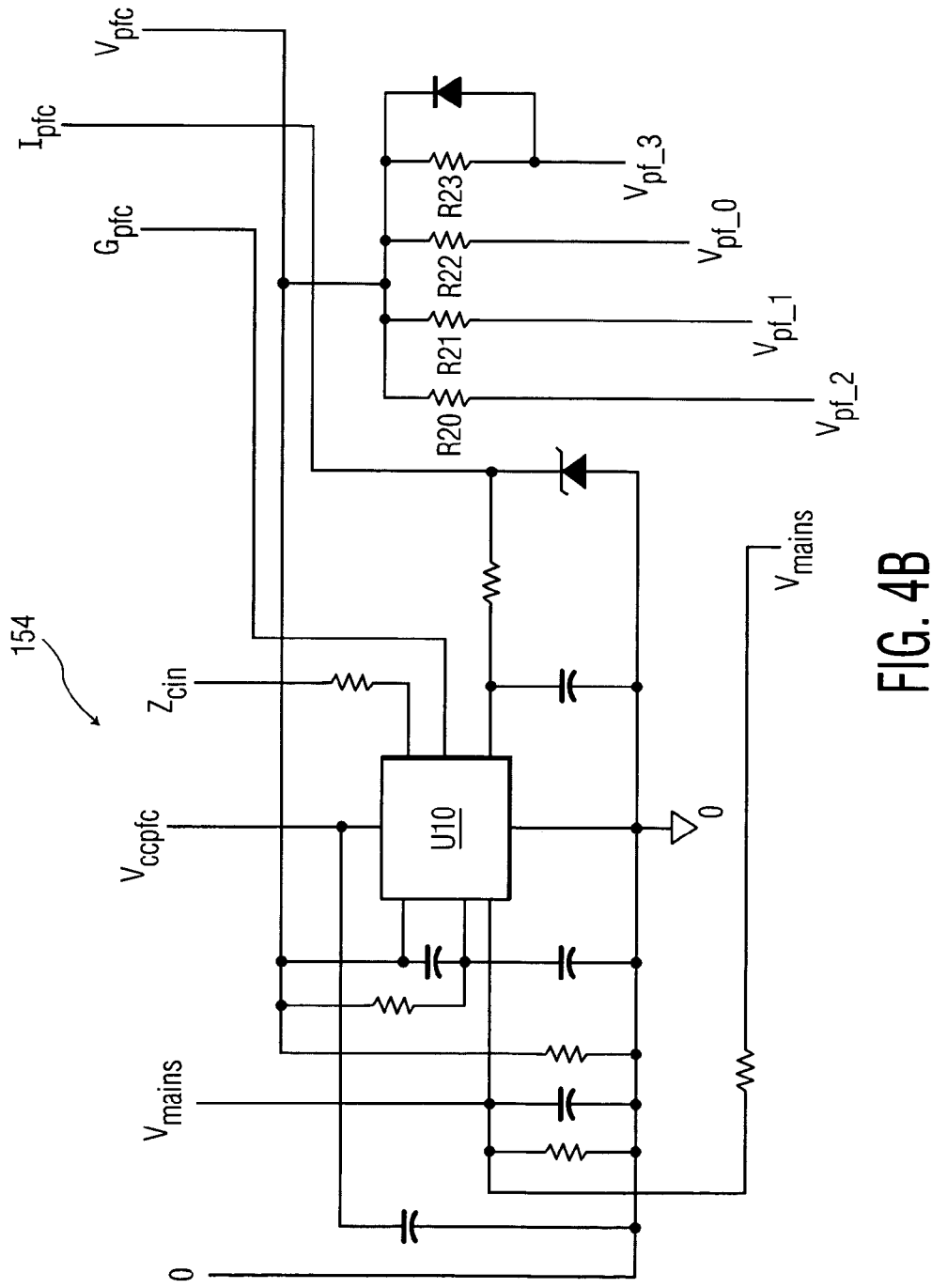

FIG. 4B shows a schematic diagram of a power factor correction (PFC) control circuit 154 in the ballast control circuit 150 for an electronic ballast made in accordance with the present invention. Using power factor correction U10, the PFC control circuit 154 processes the mains voltage signal Vmains, PFC current signal Ipfc, and PFC voltage signal Vpfc from the power factor correction circuit, and returns a PFC gate signal Gpfc to the power factor correction circuit. The PFC control circuit 154 receives a zero current input signal ZCin to indicate when the current in transformer in the PFC circuit has reached zero.

The target rail voltage for a particular mains voltage range is set by the resistor array of resistors R20, R21, R22, and R23. The ballast microcontroller responds to the mains voltage signal Vmains and supplies supply power factor voltage signals Vpf_3, Vpf_2, Vpf_1, and Vpf_0, which switch the various resistors in the resistor array to circuit ground. The resistor array supplies different voltages corresponding to possible rail voltages, which bias the PFC voltage signal Vpfc to the power factor correction U10.

Figure 4C:
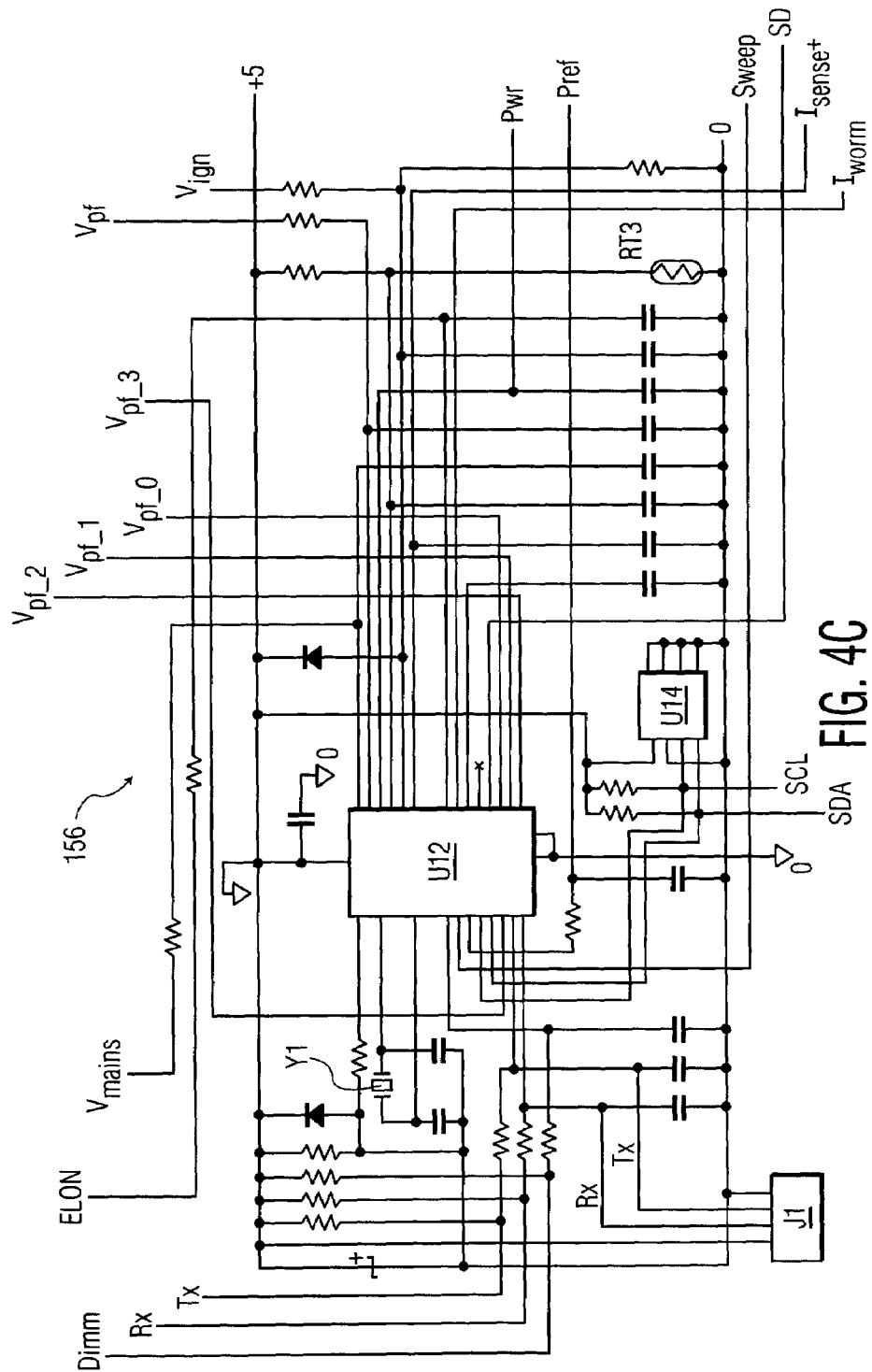
Figure 4D:
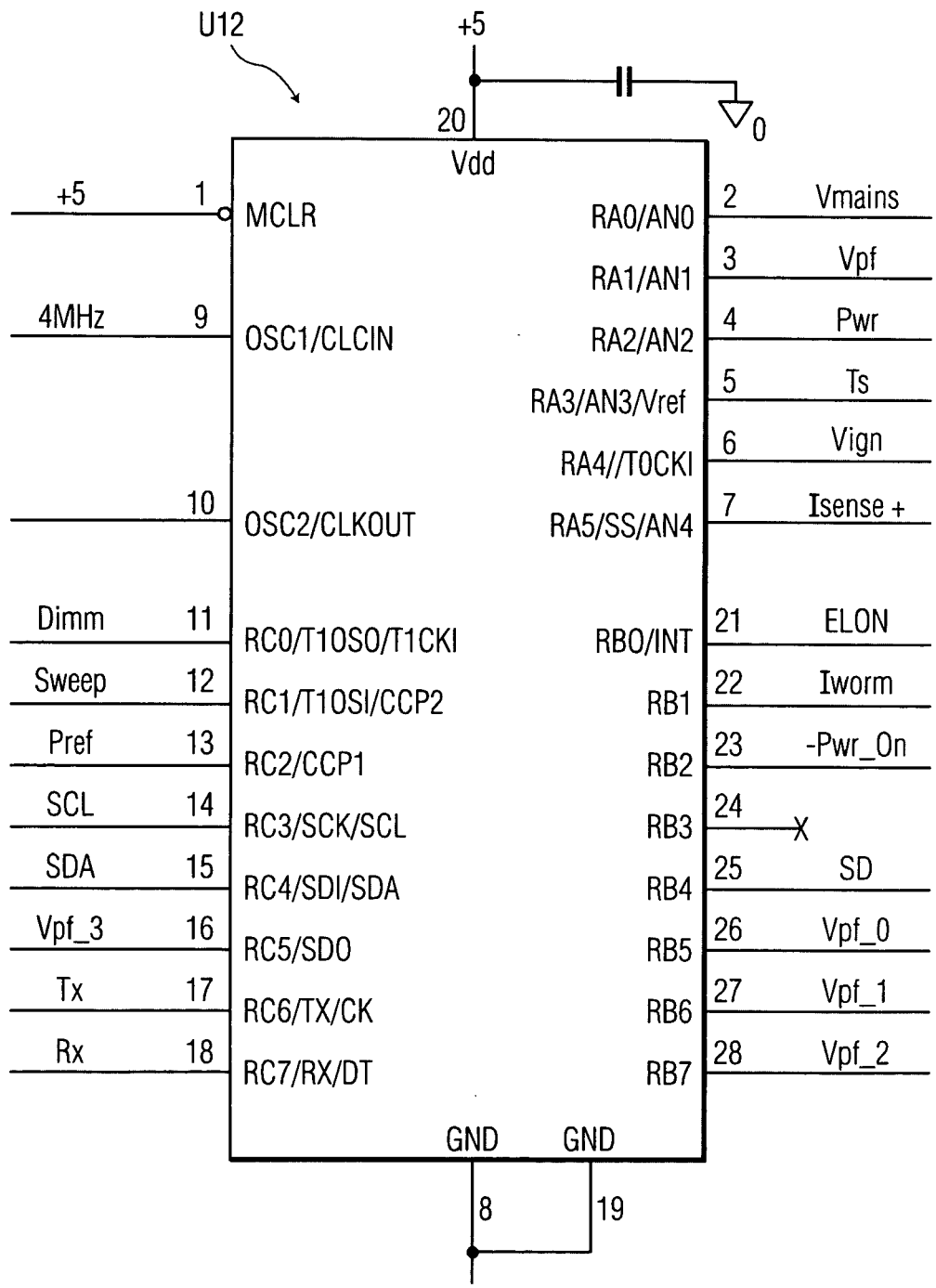

FIGS. 4C & 4D show a schematic diagram of a microcontroller circuit and ballast microcontroller detail, respectively, for an electronic ballast made in accordance with the present invention. The ballast microcontroller U12 is the main control component of the electronic ballast and the ballast control circuit. The microcontroller circuit 156 receives information on the various parameters throughout the electronic ballast and supplies control signals to the various components. Oscillator Y1 provides an oscillating signal, typically about 4 MHz, to the ballast microcontroller U12. Ballast microcontroller U12 receives 5V power from the power regulation circuit, which receives 15V power from the auxiliary low voltage power supply. EEPROM U14 stores information supplied to the ballast microcontroller U12 to tune the electronic ballast to the proper power level, run-up current, and ignition voltage.

The dimming signal Dimm from the dimming circuit is an input to the microcontroller circuit 156 directing the ballast microcontroller U12 to set the power to the HID lamp by adjusting the power reference signal Pref to the power regulation circuit.

The Sweep signal is an output from the microcontroller circuit 156 to the driver circuit to sweep the frequency and generate the required voltage during ignition. The Sweep signal is a function of the ignition voltage signal Vign. The Sweep signal also modulates the lamp current frequency during steady state operation to increase arc stability. The steady state operation is described in U.S. patent application Ser. No. 10/043,586, assigned to the same assignee as the present application and incorporated herein by reference.

The power reference signal Pref is an output from the ballast microcontroller U12 and provides the power regulation circuit with the power reference signal with which to compare the processed sensed power signal to adjust the output of the HID lamp. The power reference signal Pref controls the HID lamp power and is a function of measured rail voltage Vpf and sensed power signal Pwr. The power reference signal Pref can also be a function of the frequency dimming signal Dimm and the calibration constant from EEPROM U14. The SCL and SDA signals communicate stored information from EEPROM U14, such as power level, run-up current, and ignition voltage, to the ballast microcontroller U12.

The supply power factor voltage signals Vpf_3, Vpf_2, Vpf_1, and Vpf_0 are outputs from the ballast microcontroller U12 providing circuit grounds to the resistor array in the PFC control circuit to set the target rail voltage. The grounding of Vpf_3, Vpf_2, Vpf_1, and Vpf_0 is a function of mains voltage Vmains.

The Tx and Rx signal provide communication between the ballast microcontroller U12 and devices external to the electronic ballast through port J1 using an RS232 interface protocol.

The input voltage signal Vmains is an input to the ballast microcontroller U12 from the PFC control circuit 154 and indicates the mains voltage level. The input voltage signal Vmains determines the ballast microcontroller U12 setting the output for the supply power factor voltage signals Vpf_3, Vpf_2, Vpf_1, and Vpf_0.

The scaled PFC output voltage signal Vpf is an input to the ballast microcontroller U12 from the power factor correction circuit 117 and indicates the rail voltage.

The processed power signal Pwr is an input to the ballast microcontroller U12 from the power regulation circuit and indicates the power to the HID lamp. The processed power signal Pwr divided by the lamp current signal Isense+ provides the HID lamp voltage. The processed power signal Pwr, scaled PFC output voltage signal Vpf, a calibration constant from EEPROM U14, and Dimming signal Dimm are used to determine power reference signal Pref, which controls the HID lamp power.

The temperature signal Ts is an input to the ballast microcontroller U12 from the overcurrent protector RT3 of the microcontroller circuit 156 and indicates the temperature of the electronic ballast. The temperature signal Ts can be used by the ballast microcontroller U12 to determine that the electronic ballast should be shut down to avoid damage: the ballast microcontroller shuts down the electronic ballast by toggling the shutdown signal SD.

The ignition voltage signal Vign is an input to the ballast microcontroller U12 from the ignitor and indicates the voltage supplied to the HID lamp for ignition. The ignition voltage signal Vign can be used by the ballast microcontroller U12 to determine the magnitude of the sweep signal Sweep to start the HID lamp.

The lamp current signal Isense+ is an input to the ballast microcontroller U12 from the current regulation circuit, which receives the signal from the resonant half bridge. The lamp current signal Isense+ indicates the current to the HID lamp and is used to control runup current limit signal Iworm. The lamp current signal Isense+ is also used to calculate lamp voltage, which can be used for such functions as determining fault situations.

The ballast microcontroller U12 can determine voltage for the HID lamp by dividing the processed power signal Pwr by the lamp current signal Isense+. The ballast microcontroller U12 can use the processed power signal aPwr, current signal Isense+, and calculated HID lamp voltage to determine the magnitude of power reference signal Pref to control the HID lamp. The power reference signal Pref can also be a function of the frequency dimming signal Dimm and the calibration constant from EEPROM U14.

The ELON signal is an output from the ballast microcontroller U12 to the 120V power supply and determines when the 120V power supply supplies power to the back-up incandescent lamp. The ELON signal turns off the back-up incandescent lamp whenever the HID lamp power, as indicated by the Pwr signal to the ballast microcontroller U12, reaches a predetermined setpoint. A predetermined setpoint, such as about 50% nominal HID lamp power, can be used to indicate the point where the HID lamp provides substantial light.

The run up current limit signal Iworm is an output from the ballast microcontroller U12 to the voltage controlled oscillator of the driver circuit. The run up current limit signal Iworm sets the lamp current limit level and is required at low HID lamp voltages to limit run up current. The run up current limit signal Iworm is a function of lamp current signal Isense+, which indicates the current to the HID lamp.

The inverse power on signal −Pwr_On is the power up/reset signal for initializing the ballast microcontroller U12.

The shutdown signal SD is an output from the ballast microcontroller U12 to the high and low side driver of the driver circuit. The shutdown signal SD turns off the HID lamp on fault conditions, such as no lamp ignition, lamp voltage outside range, ballast temperature high, and mains voltage low.

Figure 4E:
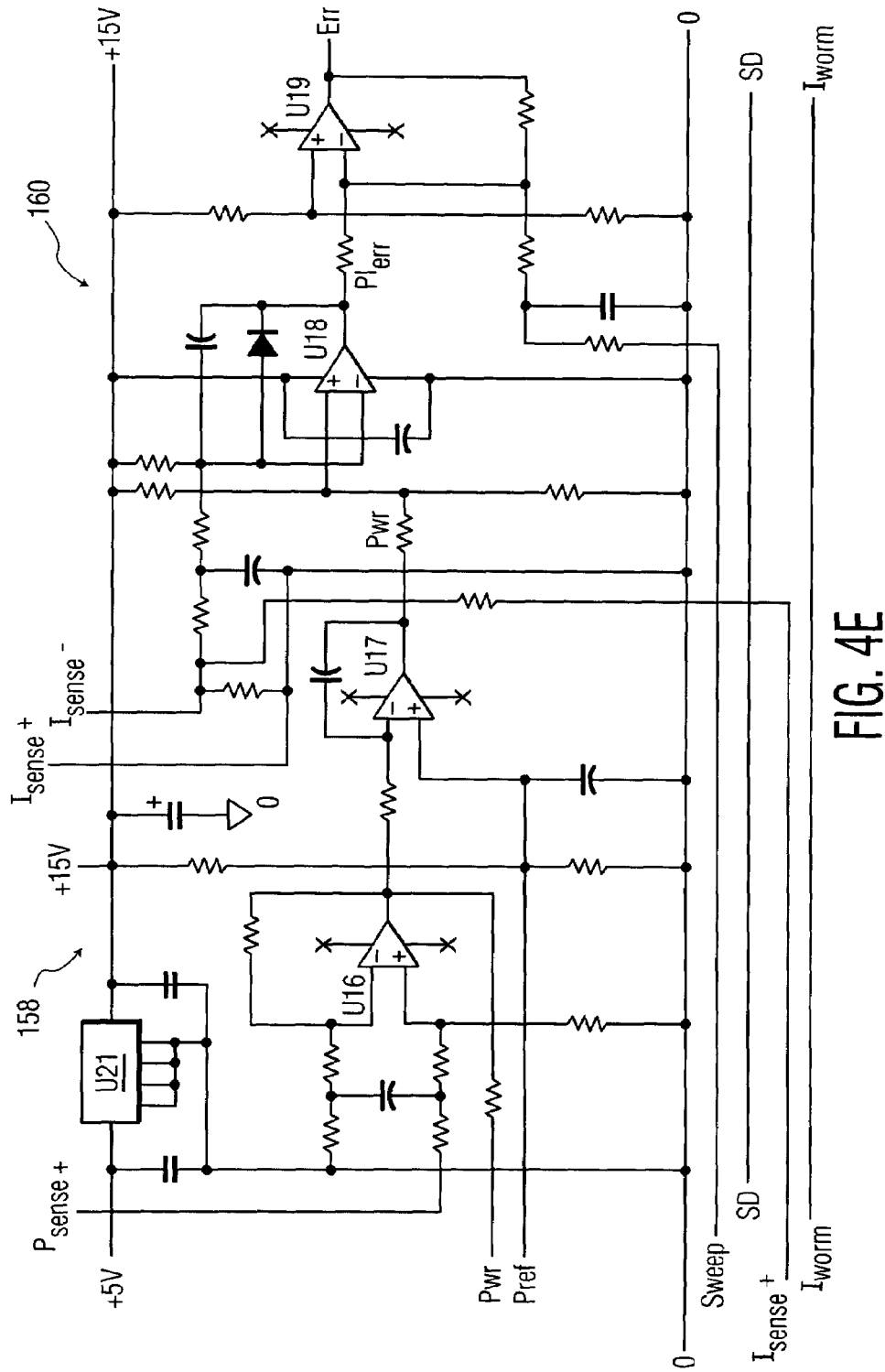

FIG. 4E shows a schematic diagram of power regulation circuit 158 and current regulation circuit 160 for an electronic ballast made in accordance with the present invention. The power regulation circuit 158 compares a sensed lamp power signal to a power reference signal to determine a power error signal, which is passed to the current regulation circuit 160. The current regulation circuit 160 uses the power error signal and sensed lamp current to determine a total error signal, which is passed to the driver circuit 162.

The power regulation circuit 158 includes operational amplifiers U16 and U17. Operational amplifier U16 receives lamp power signal Psense+ which indicates the power through switch Q9 of the resonant half bridge (see FIG. 3). Operational amplifier U16 regulates and limits the lamp power signal to produce a processed power signal Pwr, which is supplied to the operational amplifier U17 and also to the microcontroller circuit. Operational amplifier U17 compares the processed power signal Pwr to the power reference signal Pref from the microcontroller circuit to produce a power error signal Perr, which is supplied to the current regulation circuit 160. The power regulation circuit 158 also includes voltage regulator U21 to supply power to the microcontroller circuit.

The current regulation circuit 160 includes operational amplifiers U18 and U19. Operational amplifier U18 compares the power error signal Perr to the sensed lamp current signal Isense+ from the resonant half bridge to produce a power/current error signal PIerr, which is supplied to the operational amplifier U19. Operational amplifier U19 regulates and limits the power/current error signal PIerr and produces a total error signal Err, which is supplied to the driver circuit.

The sweep signal Sweep from the microcontroller circuit to the operational amplifier U19 sweeps the frequency and generates the required voltage during ignition and modulates the lamp current frequency during steady state operation to increase arc stability. The steady state operation is described in U.S. patent application Ser. No. 10/043,586, assigned to the same assignee as the present application, and incorporated herein by reference.

Figure 4F:
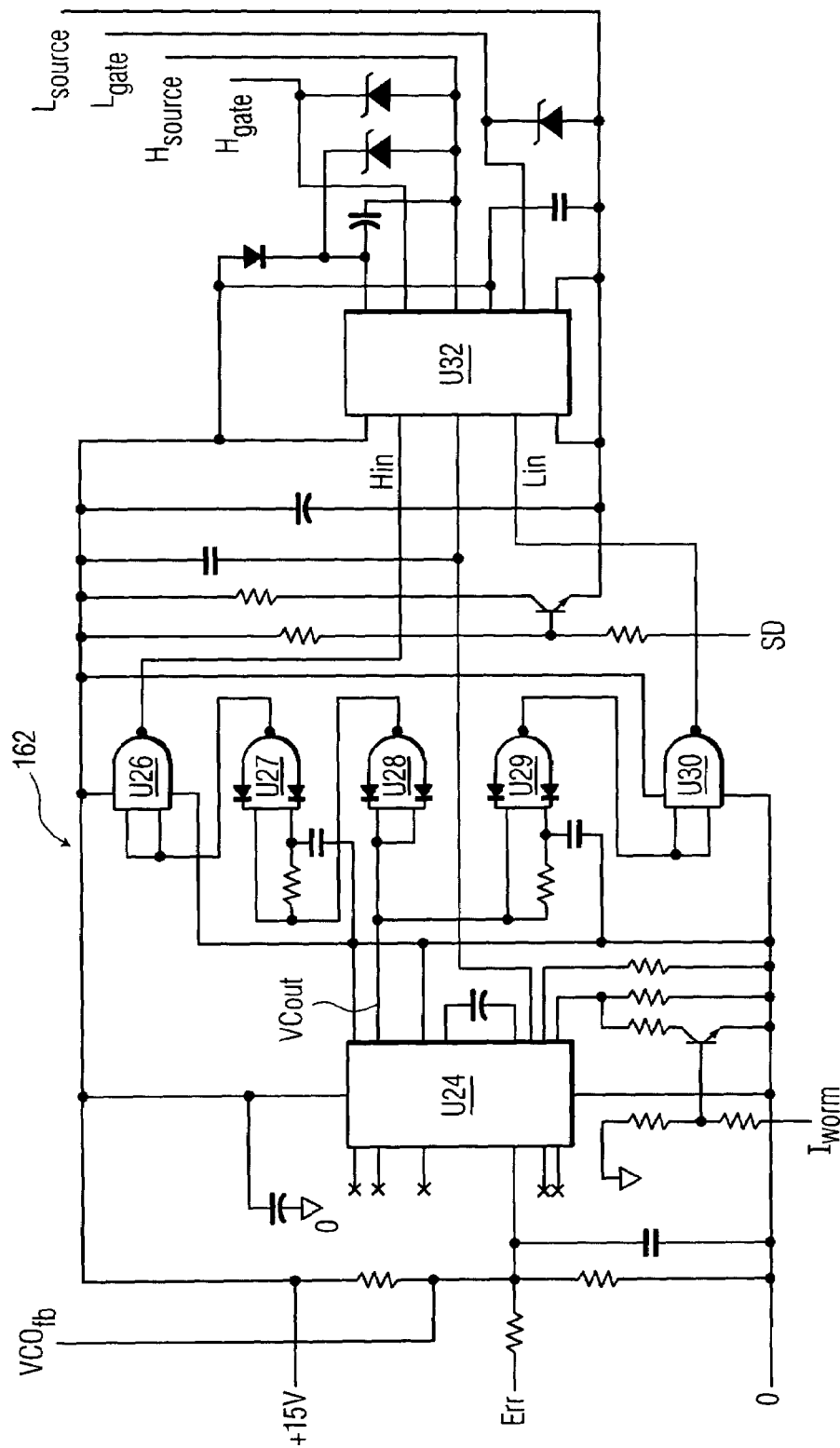

FIG. 4F shows a schematic diagram of a driver circuit 162 for an electronic ballast made in accordance with the present invention. The driver circuit 162 receives the total error signal Err from the current regulation circuit indicating the desired power to be supplied to the HID lamp and provides high gate signal Hgate and low gate signal Lgate to the resonant half bridge to control power to the HID lamp.

The driver circuit 162 comprises voltage controlled oscillator (VCO) U24, driver gates U26, U27, U28, U29, U30, and high and low side driver U32. VCO U24 receives the total error signal Err from the current regulation circuit and provides a clocked VCO output signal VCOUT proportional to the voltage of the total error signal Err. The runup current limit signal Iworm or the run shutdown signal SD from the microcontroller circuit can shut down the VCO U24 to turn off the HID lamp, if required.

The driver gates receive the VCO output signal VCOUT, which passes through three driver gates U26, U27, U28 to produce the high input signal Hin and through two driver gates U29 and U30 to produce the low input signal Lin. The use of an odd number of driver gates to produce the high input signal Hin and an even number of driver gates to produce the low input signal Lin results in the high input signal Hin and the low input signal Lin having opposite polarity with deadtime between the two signals.

High and low side driver U32 regulates the high input signal Hin and the low input signal Lin from the driver gates and provides the high gate signal Hgate and low gate signal Lgate to the resonant half bridge. The run shutdown signal SD from the microcontroller circuit can shut down the VCO U24 to turn off the HID lamp, if required.

Figure 5A:
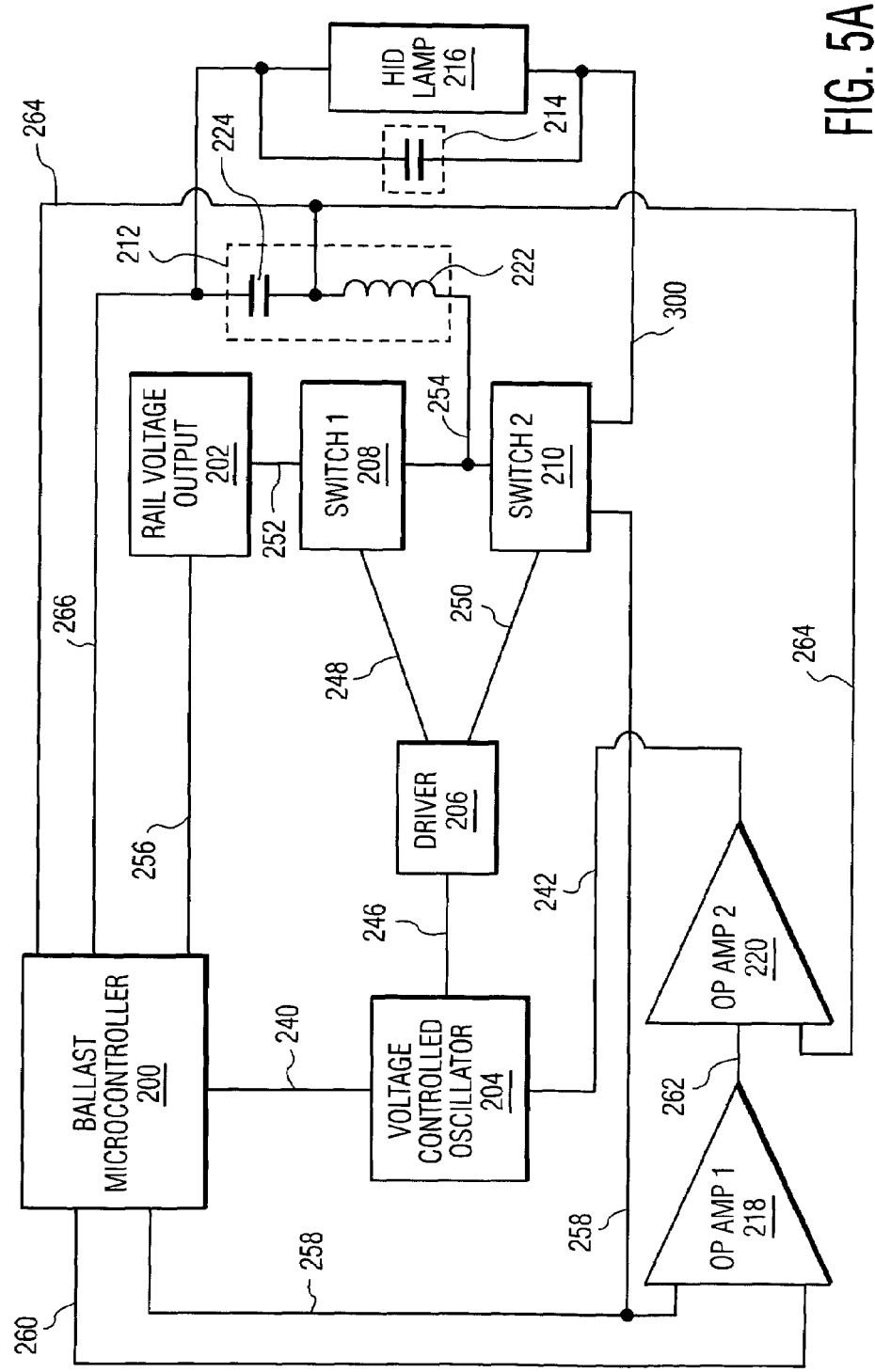
FIGS. 5A–5C show block diagrams of an ignition and operation control circuit for an electronic ballast with ignition and operation control made in accordance with the present invention.
Figure 5B:
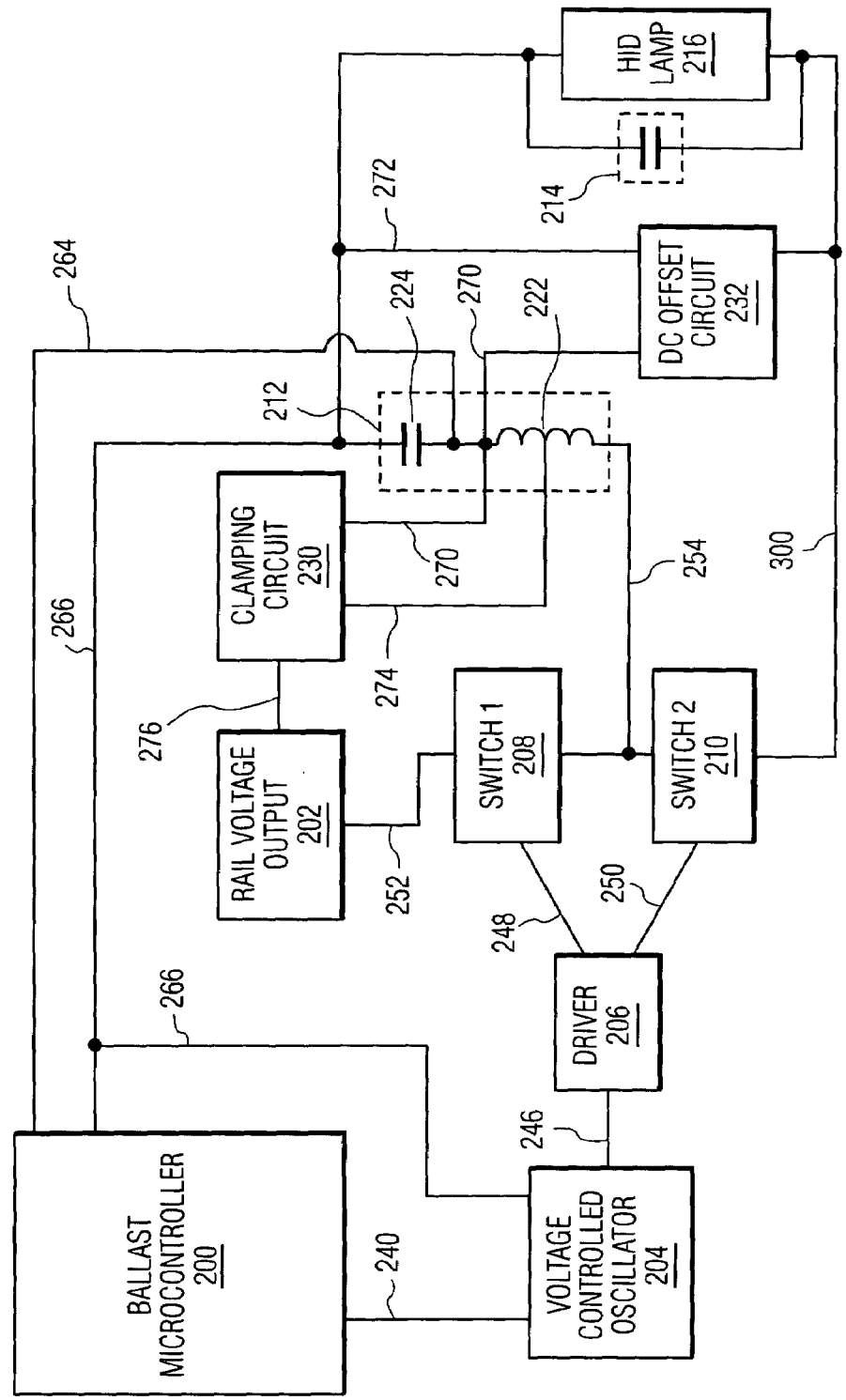
Figure 5C:
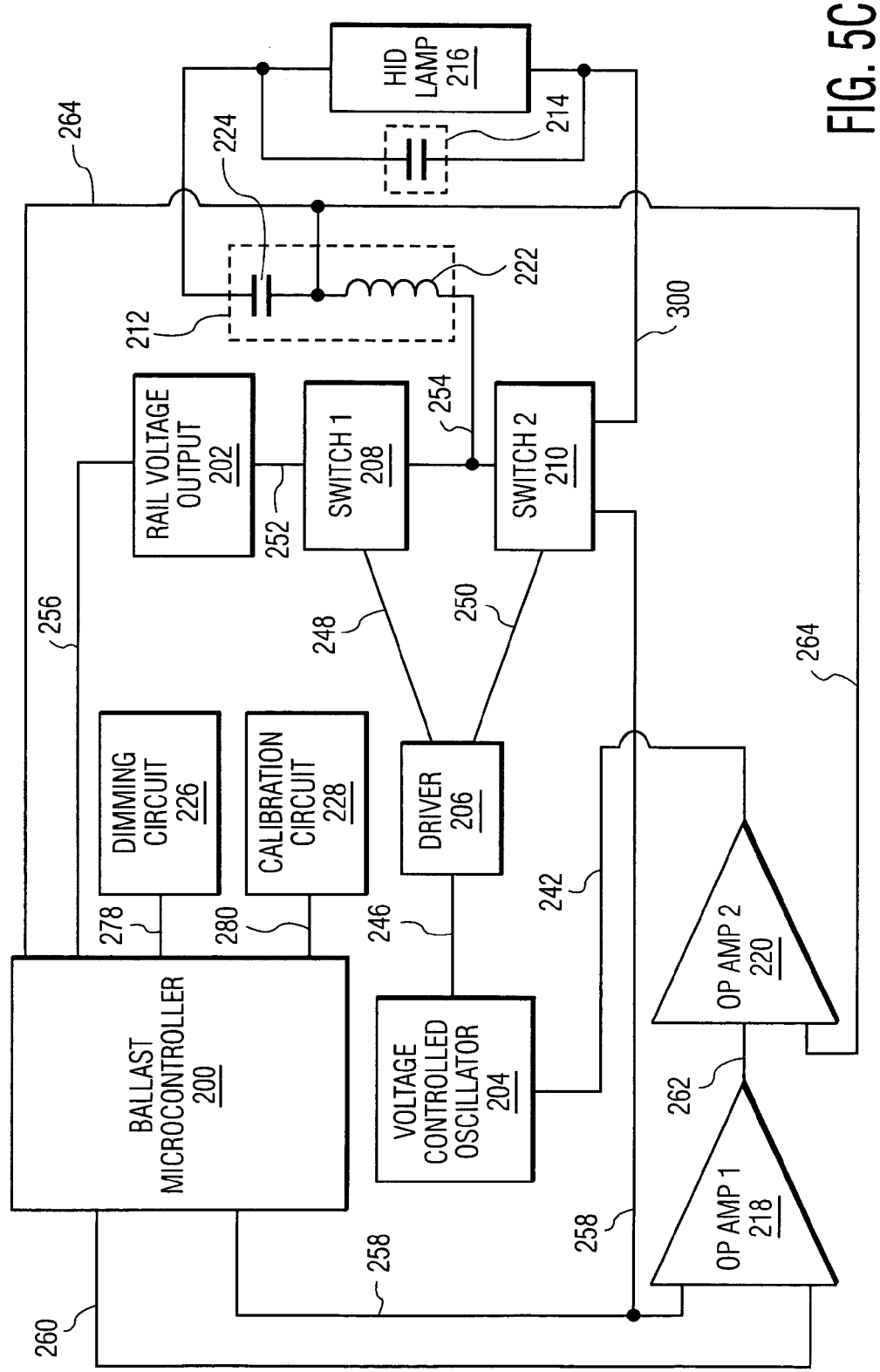

FIGS. 5A–5C show block diagrams of an ignition and operation control circuit for an electronic ballast with ignition and operation control made in accordance with the present invention. Referring to FIG. 5A, the voltage controlled oscillator (VCO) 204 is responsive to sweep signal 240 from ballast microcontroller 200 and to total error signal 242 from second operational amplifier (op Amp) 220. The ballast microcontroller 200 is any general purpose control device, such as a PIC16C73B 8-Bit CMOS microcontroller manufactured by Microchip Technology Inc. Generally, the ballast microcontroller 200 is responsive to an HID lamp feedback signal and generates an HID lamp control signal. The VCO 204 provides VCO output signal 246 to driver 206, which alternately provides high gate signal 248 and low gate signal 250 to first switch 208 and second switch 210, respectively. Rail voltage output 202 supplies power 252 to the first switch 208. Switched power 254 is supplied across HID lamp 216 and parallel capacitive circuit 214 through inductive circuit 212 comprising inductive element 222 and capacitive element 224. Sensed rail voltage signal 256 is supplied to the ballast microcontroller 200 from the rail voltage output 202. Common 300 provides a circuit common.

First operational amplifier (op amp) 218 compares sensed lamp power signal 258 from second switch 210 and power reference signal 260 from ballast microcontroller 200 to generate power error signal 262. The sensed lamp power signal 258 from second switch 210 is also provided to ballast microcontroller 200. Second operational amplifier (op amp) 220 compares power error signal 262 from first op amp 218 and sensed lamp current signal 264 from the inductive circuit 212 to generate total error signal 242. The sensed lamp current signal 264 is picked up at the connection between inductive element 222 and capacitive element 224 of the inductive circuit 212 and is supplied to the ballast microcontroller 200. Those skilled in the art will appreciated that the sensed lamp current signal 264 can be picked up anywhere within the inductive circuit 212 or any circuit in series with the inductive circuit 212. Ignition voltage signal 266 is picked up at the connection between the inductive circuit 212 and the HID lamp 216 and is supplied to the ballast microcontroller 200.

FIG. 5B, in which like elements share like reference numbers with FIG. 5A, shows a block diagram of an ignition circuit for an electronic ballast with ignition and operation control made in accordance with the present invention. In this example, the voltage controlled oscillator (VCO) 204 is responsive to sweep signal 240 from ballast microcontroller 200. The VCO 204 provides VCO output signal 246 to driver 206, which alternately provides high gate signal 248 and low gate signal 250 to first switch 208 and second switch 210, respectively. Rail voltage output 202 supplies power 252 to the first switch 208. Switched power 254 is supplied across HID lamp 216 and parallel capacitive circuit 214 through inductive circuit 212 comprising inductive element 222 and capacitive element 224. Ignition voltage signal 266 is picked up at the connection between the inductive circuit 212 and the HID lamp 216 and is supplied to the ballast microcontroller 200. The ignition circuit uses the resonance between the inductive circuit 212 and the parallel capacitive circuit 214 to apply the ignition voltage to the HID lamp 216 at the fundamental harmonic of the resonance, without the need of higher harmonics.

During ignition of the HID lamp 216, the ignition voltage signal 266 provides a feedback signal to the ballast microcontroller 200 so that the ballast microcontroller 200 can control the desired ignition voltage to the HID lamp 216. The ballast microcontroller 200 is any control device responsive to an ignition voltage signal 266 and providing a sweep signal 240, such as a PIC16C73B 8-Bit CMOS microcontroller manufactured by Microchip Technology Inc. In one embodiment, the ballast microcontroller 200 stores constants and performs calculations to obtain the desired sweep signal 240 for a given ignition voltage signal 266. In another embodiment, the ballast microcontroller 200 can store a look-up table correlating and providing the desired sweep signal 240 for a given ignition voltage signal 266.

In one embodiment, the ignition voltage signal 266 can be provided to VCO 204. The VCO 204 can be responsive to the ignition voltage signal 266 to adjust the VCO output signal 246 independent of the sweep signal 240 from the ballast microcontroller 200. In another embodiment, the VCO 204 can provide control of the VCO output signal 246, in addition to the control of the ballast microcontroller 200. The VCO 204 can be set to clamp the VCO output signal 246 if the ignition voltage signal 266 exceeds a certain setpoint, regardless of the sweep signal 240.

In another embodiment, sensed lamp current signal 264 can be picked up at the connection between inductive element 222 and capacitive element 224 of the inductive circuit 212 and supplied to the ballast microcontroller 200. The ballast microcontroller 200 can use the sensed lamp current signal 264 as a feedback signal in addition to or in place of the ignition voltage signal 266 to determine the sweep signal 240.

In yet another embodiment, a clamping circuit 230 can be provided. The clamping circuit 230 is responsive to sensed inductor current 270 and supplies an inductor current control signal 274 to limit the current flow through the inductive element 222 to the sensed rail voltage output voltage 276. The clamping circuit 230 limits the voltage to the HID lamp 216 as the HID lamp resistance drops during ignition, providing the ignition voltage for an extended time. An exemplary clamping circuit is shown in FIG. 3.

Referring to FIG. 5B, a DC offset circuit 232 can be provided in yet another embodiment. The DC offset circuit 232 is responsive to sensed inductor current 270 and applies a DC offset voltage 272 across the HID lamp 216. The DC offset voltage 272 provides additional voltage to the HID lamp 216 for ignition, beyond the voltage available from application of a square or sinusoidal voltage alone. This reduces the ignition voltage that must be applied by the fundamental harmonic of the resonance between the inductive circuit 212 and the parallel capacitive circuit 214. An exemplary DC offset circuit is shown in FIG. 3.

FIG. 5C, in which like elements share like reference numbers with FIG. 5A, shows a block diagram of an operation circuit for an electronic ballast with ignition and operation control made in accordance with the present invention. In this example, the voltage controlled oscillator (VCO) 204 is responsive to total error signal 242 from second operational amplifier (op amp) 220. The VCO 204 provides VCO output signal 246 to driver 206, which alternately provides high gate signal 248 and low gate signal 250 to first switch 208 and second switch 210, respectively. Rail voltage output 202 supplies power 252 to the first switch 208. Switched power 254 is supplied across HID lamp 216 and parallel capacitive circuit 214 through inductive circuit 212 comprising inductive element 222 and capacitive element 224. Sensed rail voltage signal 256 is supplied to the ballast microcontroller 200 from the rail voltage output 202.

First operational amplifier (op amp) 218 compares sensed lamp power signal 258 from second switch 210 and power reference signal 260 from ballast microcontroller 200 to generate power error signal 262. The sensed lamp power signal 258 from second switch 210 is also provided to ballast microcontroller 200. Second op amp 220 compares power error signal 262 from first op amp 218 and sensed lamp current signal 264 from the inductive circuit 212 to generate total error signal 242. The sensed lamp current signal 264 is picked up at the connection between inductive element 222 and capacitive element 224 of the inductive circuit 212 and is supplied to the ballast microcontroller 200.

During operation of the HID lamp 216, the sensed rail voltage signal 256, sensed lamp current signal 264, and sensed lamp power signal 258 provide feedback to the ballast microcontroller 200, so that the ballast microcontroller 200 can control the desired power to the HID lamp 216 by setting the power reference signal 260. In one embodiment, the ballast microcontroller 200 stores constants and performs calculations to obtain the desired power reference signal 260 for given feedback signals. In another embodiment, the ballast microcontroller 200 can store a look-up table correlating and providing the desired power reference signal 260 for given feedback signals. The control of the power to the HID lamp 216 is further regulated by comparing sensed lamp power signal 258 to power reference signal 260 at first op amp 218 producing power error signal 262, and comparing power error signal 262 to sensed lamp current signal 264 at second op amp 220 producing total error signal 242. Total error signal 242 is provided to the VCO 204, which sets the power to the HID lamp 216 through the VCO output signal 246. Those skilled in the art will appreciate that the first op amp 218 and second op amp 220 can be omitted and the power reference signal 260 provided directly to ballast microcontroller 200 if desired for a particular application. In addition, other or additional system status signals can be provided to the first op amp 218 or second op amp 220.

In one embodiment, a dimming circuit 226 can provide a dimming signal 278 to the ballast microcontroller 200. The ballast microcontroller 200 can be responsive to the dimming signal 278 to adjust the power reference signal 260 to the desired fraction of full power, dimming the HID lamp 216. The dimming circuit 226 can be responsive to a manual or automatic input signal to adjust the degree of dimming. An exemplary dimming circuit is shown in FIG. 4A.

Referring to FIG. 5C, a calibration circuit 228 can provide a calibration signal 280 to the ballast microcontroller 200 in another embodiment. The ballast microcontroller 200 can be responsive to the calibration signal 280 to adjust the calibration constants used in computation by the ballast microcontroller 200. The calibration signal 280 can be analog or digital, serial or parallel, and can update values stored in the ballast microcontroller 200 to improve operation of the electronic ballast. The calibration circuit 228 can be responsive to an input signal and store the calibration constants, such as the exemplary calibration circuit shown in FIG. 4C, the calibration circuit having port J1 and EEPROM U14.

It is important to note that FIGS. 1–5 illustrate specific applications and embodiments of the present invention, and are not intended the limit the scope of the present disclosure or claims to that which is presented therein. For example, the various voltage, current, and power signals used can be determined at a number of circuit locations and using a number of methods. Upon reading the specification and reviewing the drawings hereof, it will become immediately obvious to those skilled in the art that myriad other embodiments of the present invention are possible, and that such embodiments are contemplated and fall within the scope of the presently claimed invention.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

The invention claimed is:

1. An ignition and operation control circuit for an electronic ballast comprising:
    a ballast microcontroller (200), the ballast microcontroller (200) being responsive to at least one high intensity discharge (HID) lamp feedback signal and generating an HID lamp control signal;
    a voltage controlled oscillator (VCO) (204), the VCO (204) being responsive to the HID lamp control signal and generating a VCO output signal (246);
    a driver (206), the driver (206) being responsive to the VCO output signal (246) and generating a high gate signal (248) and a low gate signal (250);
    a rail voltage output (202), the rail voltage output (202) providing power (252);
    a first switch (208), the first switch (208) being responsive to the high gate signal (248) and receiving the power (252);
    a second switch (210), the second switch (210) being responsive to the low gate signal (250) and being operably connected between the first switch (208) and common (300);
    a parallel capacitive circuit (214), the parallel capacitive circuit (214) having a first end and a second end, the second end operably connected to the common (300); and
    an inductive circuit (212), the inductive circuit (212) operably connected between the first end of the parallel capacitive circuit (214) and a junction between the first switch (208) and the second switch (210).

2. The ignition and operation control circuit of claim 1 wherein the HID lamp feedback signal is a sensed lamp current signal (264) and the HID lamp control signal is a sweep signal (240).

3. The ignition and operation control circuit of claim 1 wherein the HID lamp feedback signals are a sensed rail voltage signal (256), a sensed lamp current signal (264), and a sensed lamp power signal (258), and the HID lamp control signal is a power reference signal (260).

4. The ignition and operation control circuit of claim 1 further comprising:
    a first operational amplifier (218), the first operational amplifier (218) being responsive to a sensed lamp power signal (258) and a power reference signal (260), and generating a power error signal (262);
    a second operational amplifier (220), the second operational amplifier (220) being responsive to the power error signal (262) and a sensed lamp current signal (264), and generating a total error signal (242);
    wherein the HID lamp feedback signals are a sensed rail voltage signal (256), the sensed lamp current signal (264), and the sensed lamp power signal (258), and the HID lamp control signal is the total error signal (242).

5. The ignition and operation control circuit of claim 4 further comprising a dimming circuit (226), the dimming circuit (226) generating a dimming signal (278), wherein the ballast microcontroller (200) is responsive to the dimming signal (278).

6. The ignition and operation control circuit of claim 4 further comprising a calibration circuit (228), the calibration circuit (228) generating a calibration signal (280), wherein the ballast microcontroller (200) is responsive to the calibration signal (280).

7. The ignition and operation control circuit of claim 1 wherein the HID lamp feedback signal is an ignition voltage signal (266) and the HID lamp control signal is a sweep signal (240).

8. The ignition and operation control circuit of claim 7 further comprising a DC offset circuit (232), the DC offset circuit (232) being operably connected in parallel to the parallel capacitive circuit (214) and being responsive to a sensed inductor current (270) from the inductive circuit (212).

9. The ignition and operation control circuit of claim 7 further comprising:
    a clamping circuit (230), the clamping circuit (230) being responsive to a
    sensed inductor current (270) from the inductive circuit (212) and a sensed rail voltage output voltage (276) from the rail voltage output (202);
    wherein the clamping circuit (230) generates an inductor current control signal (274), the inductive circuit (212) being responsive to the inductor current control signal (274).

10. The ignition and operation control circuit of claim 7 wherein the VCO (204) is responsive to the ignition voltage signal (266).

11. A method of ignition and operation control for an electronic ballast for an HID lamp (216) comprising:
    providing a ballast microcontroller (200), the ballast microcontroller (200) being responsive to at least one high intensity discharge (HID) lamp feedback signal and generating an HID lamp control signal;
    providing a parallel capacitive circuit (214), the parallel capacitive circuit (214) operably connected parallel to the HID lamp (216);
    providing an inductive circuit (212), the inductive circuit (212) being operably connected to the parallel capacitive circuit (214);
    switching power (252) to the inductive circuit (212) in response to the HID lamp control signal; and
    monitoring the HID lamp (216) to generate the at least one high intensity discharge (HID) lamp feedback signal selected from the group consisting of:
    a sensed rail voltage signal (256),
    a sensed lamp current signal (264),
    a sensed lamp power signal (258).

12. The method of claim 11 further comprising storing a look-up table in the ballast microcontroller (200), the look-up table providing the HID lamp control signal for a given HID lamp feedback signal.

13. The method of claim 11 wherein monitoring the HID lamp (216) to generate the at least one high intensity discharge (HID) lamp feedback signal comprises monitoring the HID lamp (216) to generate a sensed lamp current signal (264).

14. The method of claim 11 wherein monitoring the HID lamp (216) to generate the at least one high intensity discharge (HID) lamp feedback signal comprises monitoring the HID lamp (216) to generate a sensed rail voltage signal (256), a sensed lamp current signal (264), and a sensed lamp power signal (258).

15. The method of claim 11 further comprising dimming the HID lamp (216) in response to a dimming signal (278) to the ballast microcontroller (200).

16. The method of claim 11 further comprising:
   storing constants in the ballast microcontroller (200), and
   calculating the HID lamp control signal for a given HID lamp feedback signal using the constants.

17. The method of claim 16 wherein storing constants in the ballast microcontroller (200) comprises storing constants in the ballast microcontroller (200) in response to a calibration signal (280).

18. The method of claim 11 wherein monitoring the HID lamp (216) to generate the at least one high intensity discharge (HID) lamp feedback signal comprises monitoring the HID lamp (216) to generate an ignition voltage signal (266).

19. The method of claim 18 further comprising:
   monitoring the inductive circuit (212) to generate a sensed inductor current (270); and
   applying a DC offset voltage across the HID lamp (216) in response to the sensed inductor current (270).

20. The method of claim 18 further comprising:
   monitoring the inductive circuit (212) to generate a sensed inductor current (270); and
   clamping current flow through the inductive circuit (212) if the sensed inductor current (270) exceeds a predetermined value.

21. The method of claim 20 wherein clamping current flow through the inductive circuit (212) if the sensed inductor current (270) exceeds a predetermined value further comprises clamping current flow through the inductive circuit (212) to limit the voltage to the HID lamp (216) to a sensed rail voltage output voltage (276).

22. A system of ignition and operation control for an electronic ballast for an HID lamp (216) comprising:
   a ballast microcontroller (200), the ballast microcontroller (200) being responsive to at least one high intensity discharge (HID) lamp feedback signal and generating an HID lamp control signal;
   a parallel capacitive circuit (214), the parallel capacitive circuit (214) operably connected parallel to the HID lamp (216);
   an inductive circuit (212), the inductive circuit (212) being operably connected to the parallel capacitive circuit (214);
   means for switching power (252) to the inductive circuit (212) in response to the HID lamp control signal; and
   means for monitoring the HID lamp (216) to generate the at least one high intensity discharge (HID) lamp feedback signal selected from the group consisting of:
   a sensed rail voltage signal (256),
   a sensed lamp current and (264), and
   a sensed lamp power signal (258).

23. The system of claim 22 further comprising means for storing a look-up table in the ballast microcontroller (200), the look-up table providing the HID lamp control signal for a given HID lamp feedback signal.

24. The system of claim 22 wherein means for monitoring the HID lamp (216) to generate the at least one high intensity discharge (HID) lamp feedback signal comprises means for monitoring the HID lamp (216) to generate a sensed lamp current signal (264).

25. The system of claim 22 wherein means for monitoring the HID lamp (216) to generate the at least one high intensity discharge (HID) lamp feedback signal comprises means for monitoring the HID lamp (216) to generate a sensed rail voltage signal (256), a sensed lamp current signal (264), and a sensed lamp power signal (258).

26. The system of claim 22 further comprising means for dimming the HID lamp (216) in response to a dimming signal (278) to the ballast microcontroller (200).

27. The system of claim 22 further comprising:
   means for storing constants in the ballast microcontroller (200), and
   means for calculating the HID lamp control signal for a given HID lamp feedback signal using the constants.

28. The system of claim 27 wherein means for storing constants in the ballast microcontroller (200) comprises means for storing constants in the ballast microcontroller (200) in response to a calibration signal (280).

29. The system of claim 22 wherein means for monitoring the HID lamp (216) to generate the at least one high intensity discharge (HID) lamp feedback signal comprises the means for monitoring the HID lamp (216) to generate an ignition voltage signal (266).

30. The system of claim 29 further comprising:
   means for monitoring the inductive circuit (212) to generate a sensed inductor current (270); and
   means for applying a DC offset voltage across the HID lamp (216) in response to the sensed inductor current (270).

31. The system of claim 29 further comprising:
   means for monitoring the inductive circuit (212) to generate a sensed inductor current (270); and
   means for clamping current flow through the inductive circuit (212) if the sensed inductor current (270) exceeds a predetermined value.

32. The system of claim 31 wherein means for clamping current flow through the inductive circuit (212) if the sensed inductor current (270) exceeds a predetermined value further comprises means for clamping current flow through the inductive circuit (212) to limit the voltage to the HID lamp (216) to a sensed rail voltage output voltage (276).

* * * * *